Feb. 13, 1968  D. E. McKENZIE ET AL  3,368,921
CONVERSION OF HEAT TO ELECTRICITY BY
ELECTROCHEMICAL MEANS USING UO₃ MELT
Filed June 17, 1960
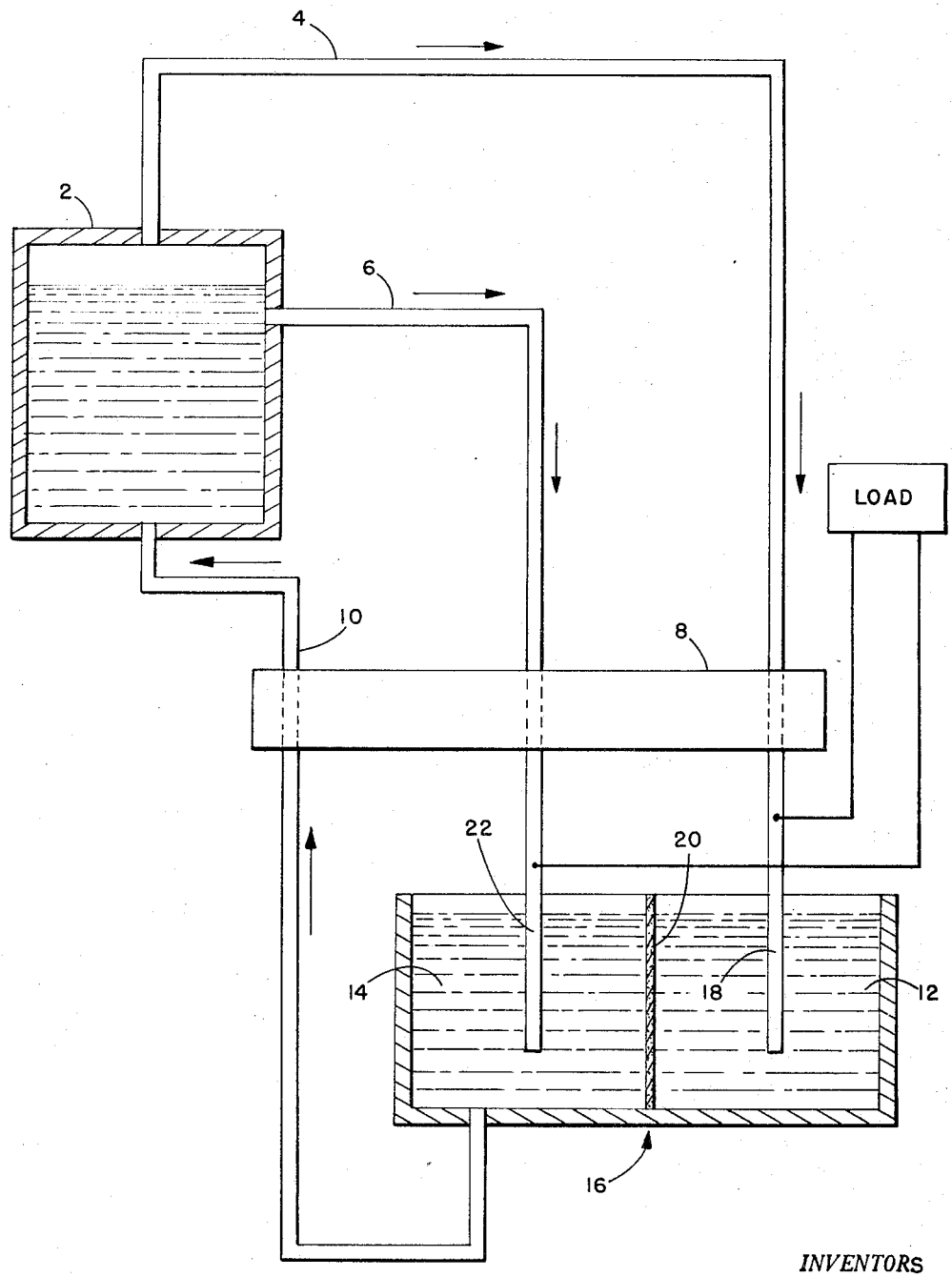
INVENTORS
DONALD E. McKENZIE
JOHN P. HOWE
BY
Gerald A. Koris
ATTORNEY 3,368,921
CONVERSION OF HEAT TO ELECTRICITY BY ELECTROCHEMICAL MEANS USING UO₃ MELT
Donald E. McKenzie, Woodland Hills, and John P. Howe, Calabasas, Calif., assignors to North American Rockwell Corporation, a corporation of Delaware
Filed June 17, 1960, Ser. No. 36,885
4 Claims. (Cl. 136—86)

Our invention relates to a process for the conversion of heat to electricity by electrochemical means, and more particularly to a conversion method employing regenerative electrochemical systems.

Present technology limits the conversion of thermal to electrical energy, by means of a steam cycle, to about 35% efficiency. There is currently considerable interest and research on ways to increase such efficiency centered about methods of converting heat into electricity. Such methods generally involve the use of regenerative electrochemical systems and thermionic converter devices. Devices of this character possess the potential of converting heat to electricity at much higher efficiencies and lower cost than the present steam cycles.

The principal object of our present invention is to provide an efficient electrochemical method for converting heat into electricity.

Another object is to provide a simple, regenerative-type electrochemical cell and system for the conversion of heat into electricity.

Another object is to provide such a process with a cycle efficiency higher than present steam cycles.

Still another object is to provide such a cell capable of operating reversibly so as to obtain maximum efficiency.

A further object is to provide such a regenerative-type electrochemical cell wherein regeneration is accomplished at relatively low temperature, and wherein the electrochemical system does not make severe equipment demands.

Other objects and advantages of our invention will become apparent from the following description.

The single drawing is a schematic representation of one embodiment of our conversion system.

In accordance with our present invention, we have provided a system for the conversion of heat to electrical energy by electrochemical means, which comprises decomposing an oxygen-containing compound of a multivalent metal at a high temperature, and then reversing the reaction in an electrolytic cell at a low temperature, in order to release the free energy of the recombination reaction to an external electrical load. The regenerated compound is then returned to the heat source and the cycle repeated.

Of particular significance in our process, the oxygen-containing compound of the multi-valent metal is decomposed at the high temperature to give off oxygen gas and a decomposition product, normally a lower oxide compound. The oxygen gas is not corrosive and is easily managed in terms of apparatus. Furthermore, oxygen-containing compounds, especially oxides, have high decomposition temperatures and, as will be seen below, this leads to conversion cycles with high efficiency. The oxygen is conducted into a cathode compartment or half-cell where it picks up electrons being returned from the external load to the cathode, there becoming oxide ion or oxy-anion. The oxygen ion then diffuses to the anode compartment, suitably separated from the cathode half-cell by a semi-permeable membrane or barrier, and at the anode is recombined with the decomposition product entering the anode compartment from the heat source. At the low temperature the recombination reaction is spontaneous and the free energy thus released is made available to the external load, that is, the reaction frees electrons which are conducted by means of the anode to the external system. The recombined compound is then returned to the heat source where it is again decomposed and the cycle repeated. The cell reactions, using the $PbO_2$—$PbO$ system as an example, are:

At the cathode: $\frac{1}{2}O_2 + 2e^- \rightarrow O^=$.
At the anode: $PbO + O^= \rightarrow PbO_2 + 2e$.
Net cell reaction: $PbO + \frac{1}{2}O_2 \rightarrow PbO_2$.

The operation of this system is readily understood by reference to the attached schematic drawing. Taking the $PbO_2$—$PbO$ system again, $PbO_2$ is heated in a solvent in a heat source 2 to a temperature which will decompose it into $PbO + O_2$. The particular heat source used is not important; it may be fired by oil, coal, etc. The reaction products are then split into an oxygen line 4 and a PbO line 6, and routed through an economizer 8 or other heat exchanger means. The purpose of economizer 8 is to cool the reaction products to a lower temperature at which the recombination reaction is more favorable. The heat released in the economizer is transferred to the reformed compound in return line 10 to reheat it on its return path to heat source 2. After passage through economizer 8, the oxygen enters the cathode compartment 12 and the PbO stream enters the anode compartment 14 of cell 16. At the cathode 18, the oxygen picks up electrons to form the oxide ion. The oxygen ion then diffuses through the semi-permeable membrane or barrier 20, and recombines with the PbO to form $PbO_2$ at the anode 22 and thereby releases electrons to the external load in accordance with the above cell reactions. The cathode and anode are established by the cell reactions; an external electrical voltage is not impressed on the electrodes since such might cause electrolysis of cell constitutents. The $PbO_2$ is then passed through the economizer, where it is heated, thence returned to the heat source for further heating and decomposition; and the cycle is repeated. The reason for the separate anode and cathode compartments is to permit only electrochemical diffusion between the compartments. This prevents mixing of the solutions, and the recombination reaction takes place only at the electrodes.

Turning now to a more detailed examination of our invention, the requirements of the working fluid system will be examined. We find that any oxygen-containing compound of a metal having more than one valence state may be employed, such that oxygen gas is released upon decomposition of the compound. Thus, the basic requirement is met by a multi-valent metal oxide or by an oxy-anion compound of a multi-valent element, and the term "oxygen-containing compound having a multi-valent element" as used in this specification is defined to have such meaning. Particularly satisfactory are the transition series metal oxides and rare earth metal oxides. Examples of such suitable metal oxide systems, together with the temperature at which the equilibrium oxygen pressure is essentially 1 atmosphere (i.e., decomposition temperature) are given below in the table.

TABLE

| | °K. |
|---|---|
| $U_3O_8 + O_2 = UO_3$ | 1075 |
| $UO_2 + O_2 = UO_3$ | 1700 |
| $Sb_2O_3 + O_2 = Sb_2O_5$ | 1250 |
| $Cu_2O + O_2 = CuO$ | 1400 |
| $GeO + O_2 = GeO_2$ | 1750 |
| $PbO + O_2 = PbO_2$ | 650 |
| $Mn_2O_3 + O_2 = MnO_2$ | 800 |
| $Tl_2O + O_2 = Tl_2O_3$ | 1000 |
| $Ce_2O_3 + O_2 = CeO_2$ | 2000 |
| $Cr_2O_3 + O_2 = CrO_2$ | 600 |

Oxy-anion compounds having a multi-valent anion element constitute the second class of suitable oxygen-containing compounds. Examples are compounds of elements in Group VI–A of the Periodic Chart of the Elements, such as chromates, $K_2Cr_2O_7$, $K_2CrO_4$; compounds of Group VI–B elements, such as the analogous oxy-anion compounds of selenium and tellerium; and stannates and vanadates.

It is desirable to operate the process at the greatest possible temperature differential between the upper decomposition temperature ($T_1$) and the lower recombination temperature ($T_2$) since the maximum theoretical efficiency of any cycle is given by the Carnot efficiency $(T_1-T_2)/T_1$. The efficiency of our regenerative cell is thus determined by the output to the input energy ratio, i.e., to $\Delta F_{T_2}/\Delta H_{T_1}$. In practice, the upper temperature $T_1$ is set by the stability of the decomposition products in liquid form. These must melt without decomposing and be stable at the lower $T_2$ cell temperatures. This is a known property of the particular oxygen-containing compounds. $T_1$ for the compounds listed above must be at least the decomposition temperatures, and it is desirable to use higher temperatures to further improve efficiency. The high decomposition temperature of the oxides is therefore beneficial in obtaining a process having high efficiency. The minimum temperature $T_2$ is the point where the constituents are still in liquid form; solidification obviously cannot be permitted.

It is noted in the table above that the temperatures required to decompose the oxide compounds generally range between about 500° and 1500° K., the maximum temperature being 2000° K. for the $CeO_2$–$Ce_2O_3$ system. When the temperature required to yield 1 atmosphere of gas is too high, the product of the cell process may be heated to a temperature short of the decomposition temperature. The additional free energy necessary to decompose the material is then supplied as electrical energy, i.e., the system would be electrolyzed at a higher temperature. The efficiency of the process is given by $$\frac{\Delta F_{T_1} - \Delta F_{T_2}}{T_1 \Delta S_{T_1}}$$

where $\Delta F_{T_1}$ is the free energy of the electrolytic decomposition, $-\Delta F_{T_2}$ is the free energy of the recombination process, and $T_1 \Delta S_{T_1}$ is the heat supplied by the heat source. The maximum efficiency is identical to a totally thermal decomposition process operating between the same two temperatures. There is, however, one advantage to be gained by such a process. If electrolytic decomposition were to yield two gases, suitable electrode construction would yield an immediate separation.

A significant advantage of our invention is that the materials used in the apparatus are not critical, and a wide variety of conventional structural, electrode, and electrolyte materials known to the art may be employed. For instance, the transfer lines may be of stainless steel, nickel, or chromium-nickel alloys. The lines should be electrically insulated from the electrodes, for example, with ceramic insulating material. The cell, or at least the interior cell lining, is of non-conducting material, such as ceramics, examples being alumina and quartz. The cells may be of conventional H-type, with the half cells separated by a semipermeable membrane or barrier, for example, zirconium oxide-calcium oxide, ceramics, glass wool, sintered glass discs, and ground silica packed in tubes. This enables the contents of the half cells to be physically separated, while permitting electrochemical diffusion of oxygen ions.

There is considerable latitude in the choice of the electrode materials and the selection of particular electrode materials is within the skill of the art. For example, any cathode material may be used which catalyzes the reaction of oxygen to oxide: $\frac{1}{2}O_2 + 2e^- = O^=$. Satisfactory examples are silver in solid or molten form, transition metal oxides such as $Fe_3O_4$ and Group VIII metals and oxides thereof, such as palladium, gold, platinum, nickel, and nickel oxide, and various semi-conductor materials such as lithium-impregnated nickel oxide. The conversion of oxygen to oxide is improved by disposing the oxygen electrode in a large surface area configuration. The choice of the anode is similarly broad, and any material not reactive with oxygen may be used. Examples of satisfactory anodes are the metals in the three Group VIII triads, such as platinum, palladium, and nickel, and transition metal oxides and phosphides.

A solvent is generally used in order to facilitate the transport of reactants around the system, but does not itself participate in the electrochemical processes. The choice of the solvent or electrolyte depends upon the particular solute oxide or oxy-anion system employed. Some systems which are suitably low-melting, such as the chromate systems, will not require any solvent. In others, the solvent will depend upon the nature of the material, and many solvents known to the art may be used. For example, the uranium oxide systems are soluble in phosphorus salts such as the alkali metal phosphate salts, such as $NaPO_3$ and $Na_4P_2O_7$. Other fused salt electrolytes may be used. Of special interest are oxide-based solvents, particularly an acidic type oxide solvent such as $K_2S_2O_7$, $NaBO_2$ and $Na_3BO_3$. Also of interest are halide-based melts, particularly alkali metal chloride-based melts such as KCl–LiCl, KCl–NaCl, and the analogous fluoride compounds. Thus, oxide, halide, and phosphate-based solvents are suitable for use in our regenerative cell.

EXAMPLE 1

In order to illustrate our invention in greater detail, the $UO_3$ system is considered using $NaPO_3$ as the solvent in the cell. The oxygen electrode consists of a platinum tube with an inch-long platinum gauze cylinder through which $O_2$ is bubbled. The anode is a 2-mil platinum foil strip, ½ inch wide x 4 inches long, with a 20-mil platinum wire lead welded to one end. The cells are of the conventional H-type. The half-cells, about 6½ inches high and 1 inch in diameter, are separated by a fine porosity fritted disc, varying in diameter from 10 to 30 millimeters.

The cells are heated to the desired temperature by a crucible furnace controlled by a variable transformer. A uniform temperature zone is obtained by packing the cells in copper shot. Temperatures are measured with chromel-alumel thermocouples inserted in a well dipping into the melt. Voltages of the cells are read with a potentiometer or voltmeter inserted into the circuit for just the length of time necessary to make the measurement. A decade box (0.1–1000 ohms) is employed to impose and vary the external load.

With the over-all decomposition reaction corresponding to:

$$3UO_3 \rightarrow U_3O_8 + \frac{1}{2}O_2$$

at approximately 1075° K., the standard free energy of formation per gram of solid $UO_3$ and solid $U_3O_8$ are equal; below this temperature, $UO_3$ is the stable oxide, while above it $U_3O_8$ is the stable oxide. At 1075° K. and 1 atmosphere $O_2$ pressure, the free energy of the above reaction is zero and, under these conditions, both $UO_3$ and $U_3O_8$ are stable.

$UO_3$ dissolved in $NaPO_3$ is introduced under 1 atmosphere of oxygen into the heat source operating at 1075° K. The heat converts $UO_3$ to $U_3O_8$ dissolved in the melt and oxygen (Q=$\Delta H^0$ reaction=7.6 Kcal./mole $UO_3$).  The oxygen and $U_3O_8$ dissolved in the melt are separately removed from the heat source and cooled through passage through the economizer to a lower temperature of 500° K. The oxygen is introduced into the cathode compartment and the $U_3O_8$ introduced into the anode compartment of the cell. The oxygen is converted to oxide ion at the cathode platinum electrode, passes through the membrane into the anode compartment where it spontaneously recombines with the $U_3O_8$ to produce $UO_3$ in solution at the anode, liberating electrons to the external load.

The maximum electrical work for the cycle is given by $\Delta F$ for the cell reaction at the lower temperature. At 500° K. this value is approximately —3.7 Kcal./mole $UO_3$, which corresponds to an electromotive force of 0.24 volt. The product $UO_3$ dissolved in the melt is removed from the cell and then heated in the economizer in which the $U_3O_8$—$O_2$ decomposition products are cooled, and returned to the heat source at about 1075° K. for decomposition. The maximum theoretical efficiency of this cycle for these temperatures is the Carnot efficiency, i.e., $$\frac{1075-500}{1075} \times 100 = 53.4\%$$

Actually, the theoretical maximum efficiency is slightly less than the Carnot efficiency, since $\Delta C_P$ is not 0. For this cycle, the $\Delta C_P$ cell reaction is —2.6 cal./° per mol· and the efficiency is $$100\frac{\Delta F_{T_2}}{\Delta H_{T_1}} = 100 \times \frac{3730}{7560} = 49.3\%$$

An over-all efficiency of about 60–65% of theoretical is obtained. The factors which prevent the attainment of the limiting efficiency are: (1) heat losses in the economizer, i.e., cooling of the $U_3O_8$ and oxygen, provide insufficient heat to raise the temperature of the $UO_3$ from 500° K. to 1075° K; (2) the power required to pump the working fluid around the cycle; and (3) the cell does not operate reversibly under load.

EXAMPLE 2

The cell described above in Example 1 is used. The system employed is the $K_2Cr_2O_7$—$K_2CrO_4$—$Cr_2O_3$ system. Because of the relatively low melting point of $K_2Cr_2O_7$ (395° C.), the use of a solvent is not necessary. $K_2Cr_2O_7$ has an equilibrium temperature of decomposition of about 1000° C. yielding $K_2CrO_4 + Cr_2O_3 + O_2$.

The half cell contents are synthesized to give the equilibrium concentrations of $K_2Cr_2O_7$ and $$K_2Cr_2O_7 + K_2CrO_4$$

by decomposing $K_2Cr_2O_7$ in air. The decomposed $K_2Cr_2O_7$ is prepared by heating $K_2Cr_2O_7$ in air for 5 hours at 800° C. The melt is then removed from the furnace, air-quenched, and ground up to a uniform mixture.

The following formulas give the cell types and the electrode reactions:

The cells are of the type:

$$Pt \left| \begin{array}{c} K_2Cr_2O_7(x_1) \\ K_2CrO_4(x_2) \\ Cr_2O_3(x_3) \end{array} \right| \left| \begin{array}{c} K_2Cr_2O_7(x'_1) \\ K_2CrO_4(x'_2) \end{array} \right| O_2, Pt$$

where $x$ denotes the mole fraction; $x_3$ and $x_2'$ are very small. The electrode reactions which occur are—

Cathode:
$3/2O_2 + 6e \rightarrow 3O^=$
$3Cr_2O_7^= + \rightarrow 6CrO_4^=$
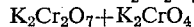
$\overline{3/2O_2 + 3Cr_2O_7^= + 6e \rightarrow 6CrO_4^=}$ Anode:
$2Cr^{+3} \rightarrow 2Cr^{+6} + 6e$
$(3O^= \rightarrow 3O^=)$
$\overline{Cr_2O_3 \rightarrow 2Cr^{+6} + 3O^= + 6e}$
$[2CrO_4^= \rightarrow Cr_2O_7^= + O^=] \times 4$
$\overline{Cr_2O_3 + 8CrO_4^= \rightarrow 5Cr_2O_7^= + 6e}$ Total reaction:
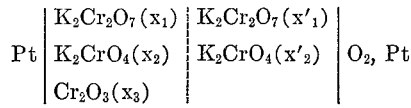

Employing the above cell together with the over-all system shown in the drawing, the cell is operated at about 410° C., and the heat source at about 900° C. The $K_2Cr_2O_7$ flows through the outlet line from the anode compartment through the economizer to the heat source and the decomposition products are returned to the respective cathode and anode compartments.

Operating two chromate system cells at the above conditions give the following readings:

CURRENT vs. VOLTAGE for $K_2Cr_2O_7$—$K_2CrO_4$—$Cr_2O_3$ CELLS

CELL I: 58.6 g. $K_2Cr_2O_7$ vs. 452 g. $K_2Cr_2O_7$—11.7 g. $K_2CrO_4$

Measured internal cell resistance =
20 ohms, $E_{open\ circuit} = .190$ v. at 475° C.

| EMF (volts) | Applied Resistance (ohms) | Current (ohms law), (milliamps)/ 3 sq. in. electrode area |
|---|---|---|
| 0.181 | 1,100 | 0.164 |
| .179 | 1,000 | .179 |
| .176 | 500 | .352 |
| .172 | 300 | .573 |
| .166 | 200 | .830 |
| .152 | 100 | 1.520 |
| .148 | 90 | 1.647 |
| .144 | 80 | 1.800 |
| .135 | 60 | 2.250 |
| .119 | 40 | 2.975 |
| .106 | 30 | 3.53 |
| .088 | 20 | 4.40 |
| .059 | 10 | 5.90 |
| .050 | 8 | 6.25 |
| .040 | 6 | 6.67 |
| .029 | 4 | 7.25 |
| .0157 | 2 | 7.85 |
| .0085 | 1 | 8.50 |
| .0071 | 0.8 | 8.90 |
| .0055 | 0.6 | 9.2 |
| .0040 | 0.4 | 10.0 |
| .0025 | 0.2 | 12.5 |
| .0017 | 0.1 | 17.0 |

Slope = $E/I = R = 21$ ohms and extrapolated $E_{o.c.} = 0.184$ v.

DROP OF CELL VOLTAGE AT CONSTANT R WITH TIME

| Time (min.) | E (volts) | R ext (ohms) |
|---|---|---|
| 0 | 0.190 | 0 |
| 1 | .0490 | 10 |
| 30 | .0483 | 10 |
| 60 | .0400 | 10 |
| 80 | .0368 | 10 |
| 81 | .150 | 0 |

CELL II: 58.8 g. $K_2Cr_2O_7$ vs. 42.6 g. $K_2Cr_2O_7$—Og $K_2CrO_4$

Measured internal cell resistance =
40 ohms, $E_{open\ circuit} = 0.206$ v. at 434° C.

| EMF (volts) | Applied Resistance (ohms) | Current (Ohm's law), (milliamps/ 3 sq. in. electrode area |
|---|---|---|
| 0.197 | 1,110 | 0.177 |
| .196 | 1,000 | .196 |
| .194 | 800 | .243 |
| .191 | 600 | .319 |
| .184 | 400 | .460 |
| .177 | 300 | .590 |
| .167 | 200 | .835 |
| .140 | 100 | 1.40 |
| .129 | 80 | 1.61 |
| .114 | 60 | 1.90 |
| .093 | 40 | 2.32 |
| .059 | 20 | 2.95 |
| .035 | 10 | 3.50 |
| .032 | 9 | 3.56 |
| .029 | 8 | 3.63 |
| .026 | 7 | 3.72 |
| .023 | 6 | 3.84 |
| .019 | 5 | 3.9 |
| .016 | 4 | 4.0 |
| .013 | 3 | 4.3 |
| .009 | 2 | 4.5 |
| .005 | 1 | 5.0 |

Slope=48 ohms, extrapolated $E_{o.c.}$=0.205 v.

DROP OF CELL VOLTAGE AT CONSTANT R WITH TIME

| Time (min.) | E (volts) | R ext (ohms) |
|---|---|---|
| 0 | 0.206 | ---------- |
| 0 | .026 | 10 |
| 65 | .018 | 10 |
| 66 | .150 | ---------- |

It should be appreciated that the above examples are illustrative rather than restrictive of our invention. Our invention should be understood to be limited only as is indicated in the appended claims.

We claim:
1. A method for the conversion of heat to electricity by electrochemical means, which comprises providing a melt of $UO_3$ in an alkali metal phosphate salt electrolyte, heating said solution at a temperature sufficient to decompose said $UO_3$ to $U_3O_8$ and $O_2$, separating the resulting $U_3O_8$ melt and the resulting oxygen gas, cooling said $U_3O_8$ and $O_2$, separately introducing the cooled $U_3O_8$ melt and oxygen decomposition products into an electrolytic cell, said cell having an alkali metal phosphate electrolyte, introducing said oxygen into a separate cathode compartment of said cell, and said $U_3O_8$ melt into a separate anode compartment of said cell, thereby reforming $UO_3$ at the anode and donating electrons to an external load, removing the resulting reformed $UO_3$ from the anode compartment, heating the removed $UO_3$, and returning the resulting $UO_3$ for repeating the foregoing cycle.

2. The method of claim 1 wherein said $UO_3$ melt is decomposed at a temperature of at least 1000° K., the oxygen and $U_3O_8$ decomposition products are cooled to a temperature of about 500° K., and wherein the temperature of said electrolytic cell is maintained at about 500° K.

3. The method of claim 2, wherein said reconstituted $UO_3$ is heated prior to repeating the cycle with heat obtained from the cooling of said decomposition products.

4. A method for the conversion of heat to electricity by electrochemical means, which comprises decomposing an alkali metal chromium compound at a temperature of at least approximately 900° C., separating the decomposition products consisting of oxygen and a second alkali metal chromium compound melt, cooling said products to a temperature of about 400° C., separately introducing the resulting cooled products into an electrolytic cell, introducing the oxygen into a separate cathode compartment of said cell and said second chromium compound melt into a separate anode compartment of said cell, the temperature of said cell being maintained at about 400° K., thereby spontaneously reforming the first-named alkali metal chromium compound at the anode and releasing electrons through the anode to an external circuit, removing the reconstituted chromium compound from the cell, heating said compound with heat obtained from the cooling of the decomposition products, and then repeating the foregoing cycle.

References Cited

UNITED STATES PATENTS

| 3,100,163 | 8/1963 | Lyons | 136—86 |
| 3,031,518 | 4/1962 | Werner et al. | 136—86 |
| 2,901,522 | 8/1959 | Bopps | 136—84 |

FOREIGN PATENTS

| 8,906 | 5/1897 | Great Britain. |
| 15,903 | 7/1897 | Great Britain. |
| 437,009 | 8/1927 | Germany. |
| 35,016 | 6/1929 | France. |
| 457 | 1/1885 | Great Britain. |

OTHER REFERENCES

Status Report on Fuel Cells, U.S. Dept. of Commerce, Office of Technical Services P.B. 151804, B. R. Stein, ARO Report No. 1, June 1959, p. 23.

Handbook of Chemistry and Physics, thirty-eight edition, 1956, p. 572.

Barbor and Lehrman—"General College Chemistry"— QD 31 B 35, pp. 132 and 133.

ALLEN B. CURTIS, *Primary Examiner.*

JOHN R. SPECK, MURRAY TILLMAN, JOHN H. MACK, WINSTON A. DOUGLAS, *Examiners.*

H. FEELEY, *Assistant Examiner.*